United States Patent

Blake

[15] 3,691,879

[45] Aug. 19, 1972

[54] MACHINE TOOL

[72] Inventor: Charles T. Blake, Shaker Heights, Ohio

[73] Assignee: The Warner & Swasey Company, Cleveland, Ohio

[22] Filed: June 11, 1970

[21] Appl. No.: 45,478

[52] U.S. Cl. ..........................82/2.5, 82/2 B, 214/1.1
[51] Int. Cl. ..............................................B23b 15/00
[58] Field of Search............82/2.5, 2 B, 2.7; 214/1.1; 29/27

[56] References Cited

UNITED STATES PATENTS

| | | | |
|---|---|---|---|
| 3,486,209 | 12/1969 | Shultz et al. | 29/27 |
| 3,324,364 | 6/1967 | Caruthers | 82/2 B |
| 3,200,680 | 8/1965 | Coffin | 82/2.5 |
| 3,131,587 | 5/1964 | Spohn et al. | 82/2.7 |
| 3,101,019 | 8/1963 | LeLan | 82/2.5 |
| 489,935 | 1/1893 | Conradson | 214/1.1 |
| 932,394 | 8/1909 | Johnson | 214/1.1 |

*Primary Examiner*—Leonidas Vlachos
*Attorney*—Yount and Tarolli

[57] ABSTRACT

An improved machine tool for operating on bar stock includes a gripper which is moved away from a chuck to pull bar stock to a work station. When the gripper has been moved through a distance sufficient to pull a desired length of bar stock to the work station, a numerical control system is effective to interrupt movement of the gripper and bar stock. The numerical control system enables different lengths of bar stock to be fed to the work station on successive cycles of operation of the machine tool in response to stored numerical control data. In one embodiment of the machine tool, the gripper is advantageously mounted on a turret which supports tools and is operated by the numerical control system in accordance with a predetermined program to machine the length of bar stock fed to the work station.

12 Claims, 5 Drawing Figures

FIG.1

INVENTOR
CHARLES T. BLAKE
BY Yound and Tarolli
ATTORNEYS

PATENTED SEP 19 1972

INVENTOR
CHARLES T. BLAKE

BY Yount and Tarolli
ATTORNEYS

FIG.3

INVENTOR
CHARLES T. BLAKE
BY Young and Tarolli
ATTORNEYS

FIG.5

MACHINE TOOL

This invention relates to a new and improved method and apparatus for feeding bar stock to a work station in a machine.

Commercial machine tools for operating on bar stock commonly include external bar stock feed assemblies. During each cycle of operation of one of these machine tools, the associated feed assembly is operated to push a predetermined length of bar stock to a work station at which it is operated on by the machine tool. If the length of bar stock fed to the work station is to be changed from one cycle of the machine tool to the next, operation of the machine tool must be interrupted between the successive cycles to adjust the feed assembly to feed the desired length of bar stock on the next cycle of the machine tool. Of course, interrupting operation of the machine tool to adjust the feed assembly reduces the overall operating efficiency of the machine tool.

Accordingly, it is an object of this invention to provide a new and improved machine tool having an internal bar stock feed assembly which is operable to feed bar stock without providing an external bar stock feed assembly.

Another object of this invention is to provide a new and improved machine tool having a bar stock feed assembly which is automatically operable to feed different, predetermined lengths of bar stock to a work station on successive cycles of operation of the machine tool.

Another object of this invention is to provide a new and improved machine for operating on bar stock and which includes a gripper for engaging the bar stock and pulling it in a direction away from a chuck to thereby feed a length of the bar stock to a work station.

Another object of this invention is to provide a new and improved machine in accordance with the next preceding object and including a turret for supporting tools for operating on the length of bar stock at the work station and wherein the gripper is mounted on the turret for movement therewith relative to the chuck.

Another object of this invention is to provide a new and proved machine having numerical control means for effecting movement of a gripper and bar stock gripped thereby to feed a predetermined length of bar stock to a work station, the numerical control means being responsive to stored numerical data to interrupt movement of the gripper and bar stock when they have moved through a distance in accordance with the stored numerical data.

Another object of this invention is to provide a new and improved machine in accordance with the next preceding object and wherein the numerical control means is responsive to a predetermined program and is operable to interrupt movement of the gripper at different locations relative to a base of the machine on successive cycles of operation of the machine to thereby enable the length of bar stock fed to the work station to be varied on successive cycles of operation in accordance with the predetermined program.

Another object of this invention is to provide a new and improved method of operating a machine for working on bar stock with tools located in a work area wherein the method includes the steps of holding the bar stock in a chuck, gripping the bar stock with a gripper, and pulling bar stock from the chuck to the work area by moving the gripper and the bar stock gripped thereby in a direction away from one end portion of the chuck.

Another object of this invention is to provide a new and improved method of operating a machine for work on bar stock with tools located in a work area wherein the method includes the steps of gripping the bar stock while it is being held by a chuck, moving the gripper assembly and bar stock gripped thereby relative to the chuck to thereby feed a portion of the bar stock to the work area, generating signals for determining the position of the gripper assembly as the bar stock and the gripper assembly are being moved to feed bar stock, and stopping movement of the gripper assembly and bar stock when the signals indicate that the gripper assembly has been moved through a distance to feed a desired length of bar stock to the work area.

These and other object and features of the invention will become more apparent upon consideration of the following description taken in connection with the accompanying drawings wherein.

Figure 1:
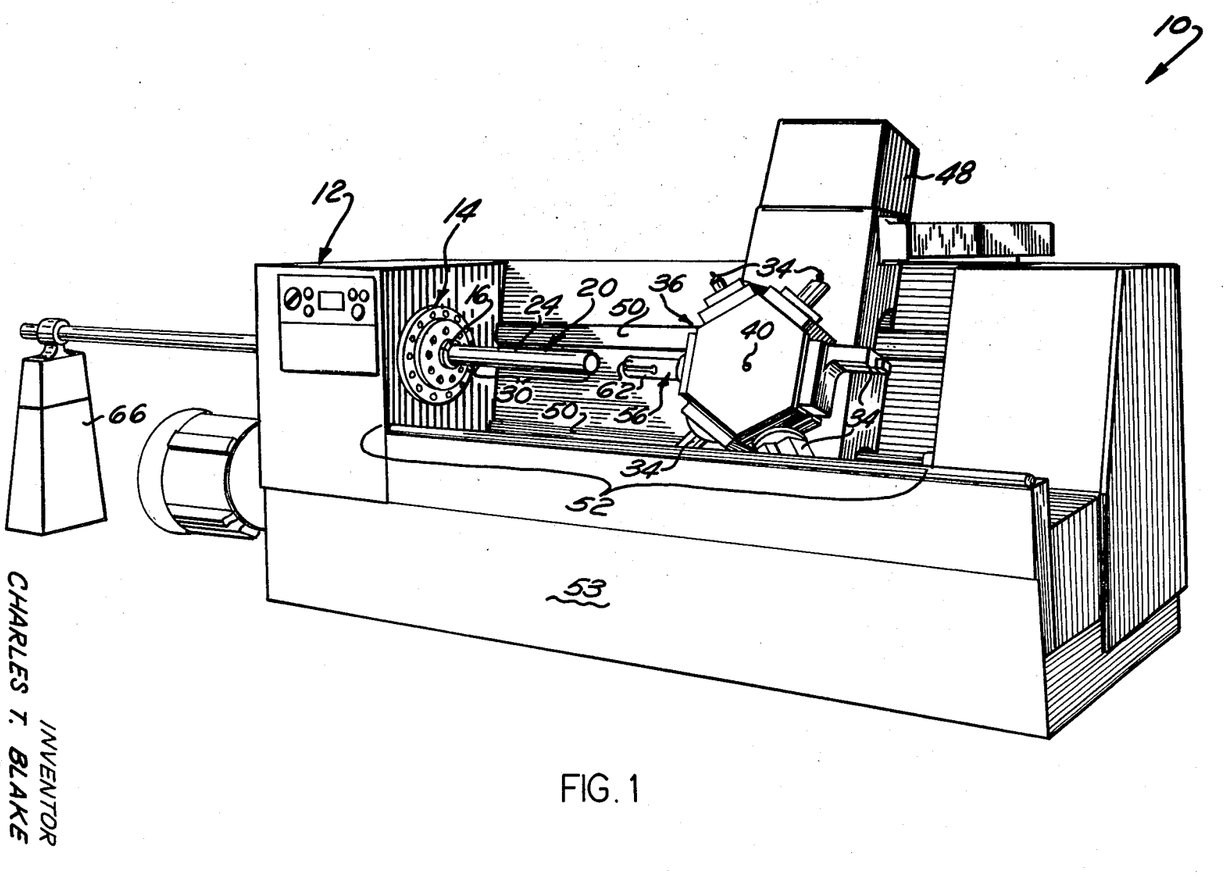
FIG. 1 is a schematic illustration of a machine tool constructed in accordance with the present invention.

A machine tool 10 having a bar stock feeding apparatus constructed in accordance with the present invention is illustrated in FIG. 1. The machine tool 10 is a well known saddle-type turret lathe and includes a headstock 12 in which a spindle assembly 14 (see FIGS. 1 and 2) is mounted. Although the machine tool 10 is a turret lathe having only a single spindle assembly 14, it is contemplated that bar feed apparatus constructed in accordance with the present invention could be used in multiple spindle machines and in machines other than turret lathes.

The spindle assembly 14 includes a collet chuck 16 having jaws 18 (FIG. 2) for gripping bar stock 20 and holding the bar stock against axial movement while the bar stock is being rotated by the spindle assembly 14. An actuator assembly 22 operates the jaws 18 of the chuck 16 between a closed condition (FIG. 2) in which the jaws securely grip the bar stock 20 and an open condition in which the bar stock is released for axial movement relative to the spindle assembly 14. Although it is contemplated that many different types of spindle assemblies can be utilized, in a specific preferred embodiment of the invention the spindle assembly 14 is the same as disclosed in U.S. Pat. No. 2,546,326 to Wetzel. In order to avoid prolixity of description, the disclosure therein is hereby incorporated into this specification by this reference thereto.

The spindle assembly 14 is operable to rotate the bar stock 20 with a leading end portion 24 of the bar stock extending into a work or machining station 30 (FIG. 1) where it is machined in a known manner tools 34 mounted on a turret 36. The turret 36 is rotatable about a center pivot 40 to index the various tools 34 to working positions relative to the leading end portion 24 of bar stock 20. The turret 36 is mounted on a cross-slide 42 (FIG. 3) for crosswise movement to position a selected tool 34 transversely relative to the bar stock 20. This transverse movement of the carriage 42 is guided by ways or tracks 44 which extend perpendicular to longitudinal axes of the bar stock 20 and spindle assembly 14. The ways 44 are mounted on a saddle or carriage 48 which is movable along tracks or ways 50 in a work area 52 which extends away from the headstock 12 for substantially the entire length of a base 53 (FIG. 1) of the machine tool 10. By moving the saddle 48 along the ways 50 which are parallel to the longitudinal axis of the spindle assembly 14, the position of the tools 34 can be adjusted longitudinally along the end portion 24 of the bar stock 20 and the base 53 of the machine tool 10.

Figure 3:
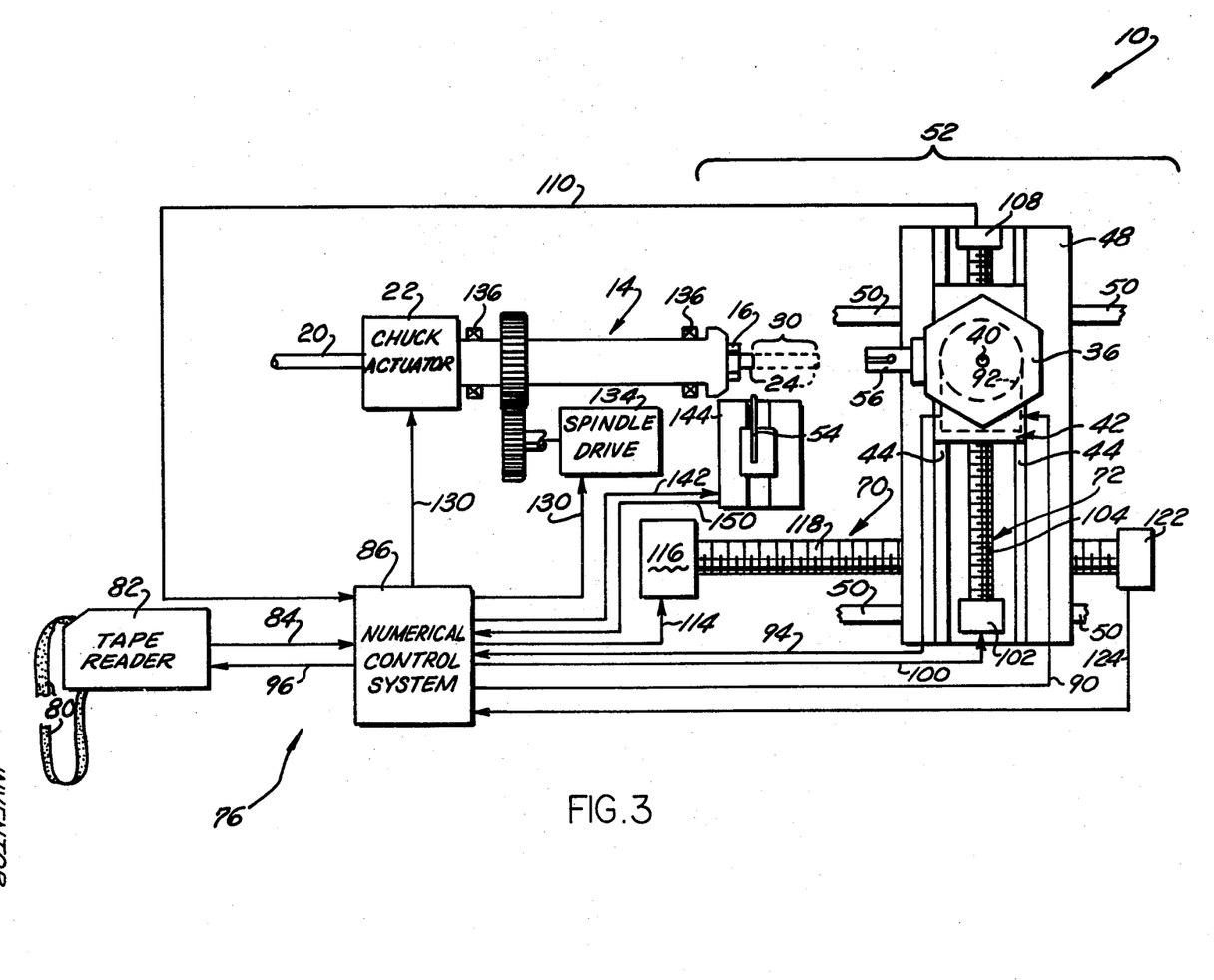
FIG. 3 is a schematic illustration depicting the relationship between the spindle assembly, a turret on which a gripper for engaging bar stock held by the spindle assembly is mounted, and a numerical control system for controlling movement of the turret and gripper to feed a predetermined length of the bar stock to a work station.

At the end of a cycle of operation of the machine tool 10, the leading end portion of the bar stock 20 is severed from the remainder of the bar stock by operation of a cut-off tool 54 (see FIG. 3). For purposes of clarity of illustration, the cutoff tool 54 has been omitted from FIG. 1. Operation of the cutoff tool 54 leaves a relatively short portion of the bar stock 20 extending from the chuck 16 into the work area 52, as shown in solid lines in FIG. 3.

When the next piece or part is to be machined from the bar stock 20, the leading end portion 24 of the bar stock must be fed to the work or machining station 30. To accomplish this, the relatively short leading end portion 24 of the bar stock is clampingly engaged by a gripper 56. The chuck 16 is then opened and a desired length of the bar stock 20 is pulled to the work station 30 by moving the gripper 56 away from the chuck 16, that is toward the right as viewed in FIG. 3. When the desired length of bar stock 20 has been pulled to the work station 30, the pulling movement of the gripper 56 is interrupted and the chuck 16 is operated to the closed condition to hold the bar stock against further axial movement. The gripper 56 is then disengaged from the bar stock which is machined by suitable operation of the machine tool 10.

Figures 2, 4:
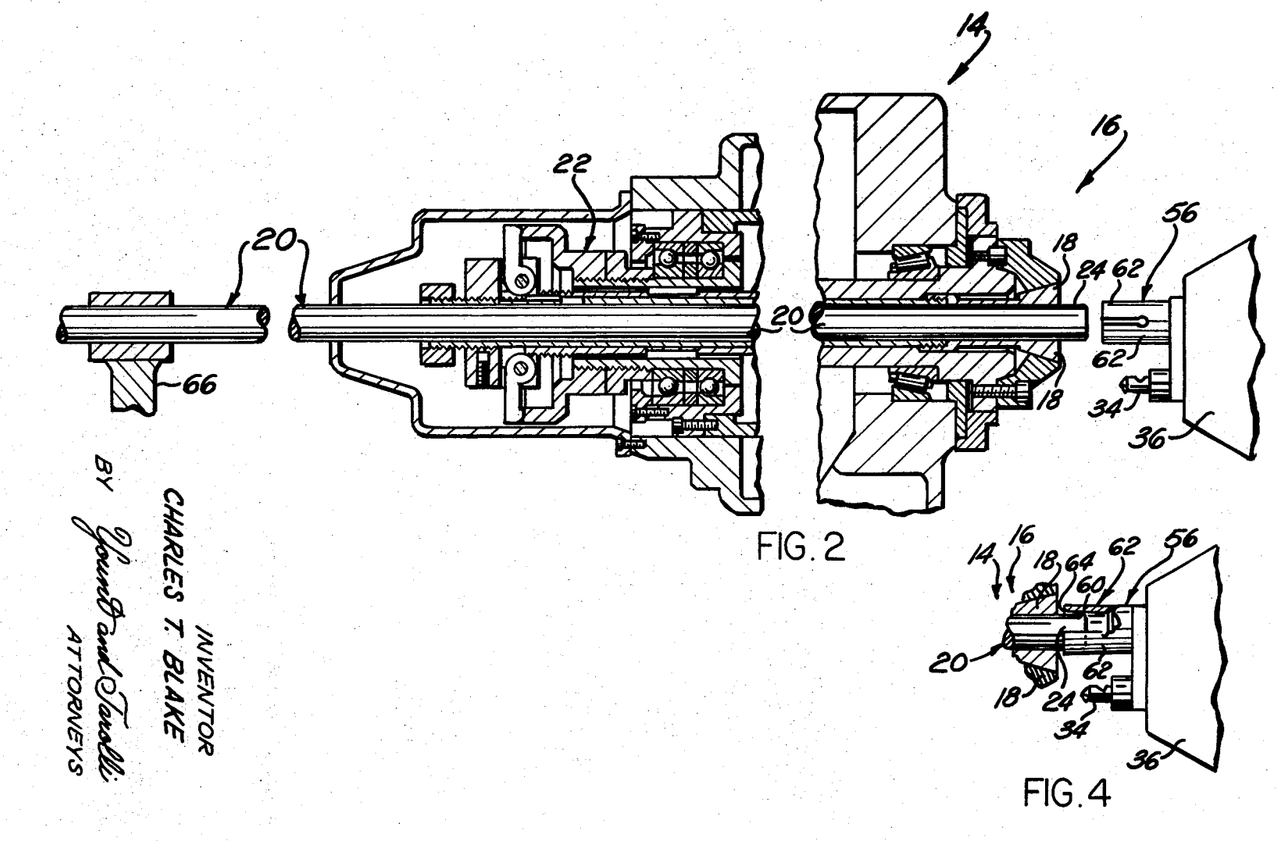
FIG. 2 is an enlarged, fragmentary sectional view of a spindle assembly of the machine tool of FIG. 1.
FIG. 4 is a fragmentary schematic illustration depicting the engagement of the gripper with a leading end portion of the bar stock.

The gripper 56 is brought into gripping engagement with the bar stock 20 by pressing the gripper axially onto the leading end portion 24 of the bar stock, in the manner illustrated in FIG. 4. Clamping or gripping surfaces 60 on the interior of resilient finger elements 62 clampingly engage the leading end portion 24 of the bar stock 20 to grip the bar stock. To provide for this clamping engagement, the surfaces 60 (FIG. 4) on the interior of the finger elements 62 define an opening having a cross-sectional configuration which is similar to and slightly smaller than the cross-sectional configuration of the bar stock 20. Therefore, the resilient fingers 62 are cammed slightly outwardly by the pressing engagement of sloping or beveled ends 64 of the resilient fingers with the leading end portion 24 of the bar stock 20 as the gripper 56 is pressed axially toward the spindle assembly 14. To minimize any possibility of damaging the chuck 16, the axial motion of the gripper 56 toward the chuck 16 is stopped with the open end portion of the gripper spaced a predetermined distance from the leading side of the chuck.

After the leading end portion 24 of the bar stock 20 has been clampingly engaged by the gripper 56, the chuck 16 is operated to the open condition to release the bar stock. The gripper 56 is then moved a predetermined distance away from the spindle assembly 14 to pull a desired length of the bar stock 20 to the machining position 30 (FIG. 3). To prevent the bar stock 20 from being bent or deflected relative to the spindle assembly 14, the gripper 56 is moved along a straight path which is coincident with the longitudinal axes of the bar stock 20 and spindle assembly 14 as the bar stock is pulled from the leading or work side of the chuck 16.

After the gripper 56 has been moved through a predetermined distance away from the spindle assembly 14 to pull a predetermined length of the bar stock 20 into the machining position 30, the movement of the gripper 56 is stopped. The chuck 16 is then operated to the closed condition to retain the predetermined length of bar stock 20 at the work or machining station 30. After this has been accomplished, the gripper 56 is disengaged from the leading end portion 24 of the bar stock 20 by continuing the movement of the gripper away from the now closed chuck 16. As the movement of the gripper 56 away from the closed chuck 16 is continued, the clamping or friction surfaces 60 of the resilient fingers 62 (FIG. 4) slide along a longitudinally extending outer surface of the bar stock 20 and off of the leading end of the bar stock while the bar stock is held against axial movement relative to the chuck.

The gripper 56 is advantageously mounted on the turret 36 so that a drive assembly 70 (FIG. 3) for moving the saddle 48 along the bed ways 50 and a drive assembly 72 for moving the cross-slide 42 along the ways or tracks 44 can be utilized to accurately position and move both the tools 34 and the gripper 56 relative to the spindle assembly 14. In addition, mounting the gripper 56 on the turret 36 enables common numerical control circuitry 76 to be utilized to control movement of the gripper 56 (FIG. 1) relative to the spindle assembly 14 and to control movement of the tools 34 in machining the bar stock 20. However, it is contemplated that in certain machines it may be desirable to provide one assembly for moving the gripper 56 and another assembly for moving tools, similar to the tools 34, relative to bar stock at a work station.

The numerical control circuitry 76 is operable to effect movement of the turret 36 and gripper 56 to pull a predetermined length of the bar stock 20 to the work station 30 and to effect movement of the tools 34 to operate on this predetermined length of bar stock. The control circuitry 76 operates the machine tool 10 through a plurality of cycles of operation in accordance with a predetermined program which is recorded on a punched tape 80. In the specific embodiment of the control circuitry 76 illustrated in FIG. 3, the tape 80 is stepped or indexed by a reader 82 in response to either the completion of a predetermined step in an operating cycle or in response to an indication on the tape. However, it is contemplated that buffer storage could be used to enable the tape to be read at least one step in advance and that the control circuitry could be constructed in accordance with U.S. Pat. No. 3,431,478 issued to J. N. Forrester et al. or U.S. Pat. No. 3,190,139 issued to E. S. Swanson et al. It is also contemplated that either an absolute or incremental type control system could be used if desired.

At the beginning of a cycle of operation of the machine tool 10, the turret 36 is operated to position the gripper 56 in axial alignment with the bar stock 20. To accomplish this, the turret 36 is indexed in accordance with data read from the tape 80 and sent over a path or connection 84 to a numerical control system 86. In response to this command data, the numerical control system 86 sends a control signal over a path or connection 90 to a drive mechanism 92 on the cross-slide 42. The drive mechanism 92 then rotates or indexes the turret 36 to the position illustrated in FIG. 3 in which the open end of of the gripper 56 faces toward the spindle assembly 14. A feedback signal is sent along a path or connection 94 to the numerical control system 86 to indicate the completion of this indexing operation. Upon receipt of this feedback signal, the numerical control system 86 transmits a signal on a lead 96 to the reader 82 which steps the tape 80. The reader 82 thereupon reads the tape 80 and relays numerical data stored on the tape to the numerical control system 86. This numerical data represents a numerical corresponding to the displacement of the turret 36 from a reference position on the saddle 48 when a longitudinal axis of the gripper 56 is aligned with the longitudinal axis of the bar stock 20.

Upon receipt of this data, the numerical control system 86 sends a control signal on a lead 100 to operate a servomotor 102 in the cross-slide drive assembly 42. The servomotor 102 is operated in the proper direction to rotate a drive screw 104 and thereby more the cross-slide 42 to a position (FIG. 3) in which the gripper 56 is axially aligned with the spindle assembly 14. During this movement of the cross-slide 42, an encoder or a signal generator 108 transmits electrical signals indicative of the existing displacement of the turret 36 and gripper 56 from a reference or zero position on the saddle 48. When this feedback signal corresponds to the numerical data stored in the control system 86, the control system interrupts operation of the servomotor 102 and transmits a signal to the reader 82 to step the tape 80.

Once the gripper 56 has been aligned with the bar stock 20, the gripper is moved toward the chuck 16 and into engagement with the relatively short end portion 24 of the bar stock 20. Accordingly, the reader 82 reads the tape 80 and transmits command data representing a reference number which is determinative of the displacement of the saddle 48 and turret 36 relative to a zero or reference position when the gripper 56 grips the end portion 24 of the bar stock 20 (FIG. 4). In response to this command data, the numerical control system 86 transmits a control signal along a path or connection 114 to a servomotor 116 which rotates a drive screw 118 to move the saddle 48 along the bed ways 50 toward the chuck 16. As the saddle 48 and gripper 56 are moved toward the chuck 16 by this operation of this drive assembly 70, feedback signals are transmitted from an encoder or signal generator 122 through a path or connection 124 to the numerical control system 86. These feedback signals represent numbers which are indicative of the instantaneous or existing displacement of the saddle 48 and turret 36 from a zero or reference position relative to the spindle assembly 14. When the gripper 56 has been pressed onto the leading end portion 24 of the bar stock 20 (FIG. 4), the feedback signal from the encoder 122 corresponds to the reference or command data in the numerical control system 86. The numerical control system 86 thereupon interrupts operation of the servomotor 116 to stop the movement of gripper 56 toward the chuck 16 and simultaneously therewith transmits a signal to the tape reader 82 to index the tape 80.

After the gripper 56 has engaged the leading end of the bar stock 20, the chuck 16 is operated to the open condition and the gripper 56 is moved away from the spindle assembly 14 to pull a predetermined length of the bar stock to the work or machining position 30. Therefore, the next step on the tape 80 activates the reader 82 to send a command signal to the numerical control system 86 which in turn transmits signals along a path or connection 130 to the chuck actuator 22 to effect operation of the chuck 16 to the open condition. After a time delay sufficient to enable the chuck 16 to open, the tape 80 is again stepped and numerical data stored thereon and determinative of the length of bar stock to be pulled to the machining position 30 is read and transmitted to the numerical control system 86.

Upon receipt of this data, the numerical control system 86 again activates the servomotor 116 to operate the drive assembly 70. However, this time the direction of operation of the drive assembly 70 is reversed to move the saddle 48 and the turret 36 away from the spindly assembly 14 so that the gripper 56 pulls the leading end portion of the bar stock 20 to the machining position 30. As the gripper 56 pulls the bar stock to the machining position 30, the encoder 122 transmits feedback signals. These feedback signals are determinative of the change in location of the turret 36 and gripper 56 relative to a reference position and, therefore, of the length of bar stock which has been pulled to the machining position 30. When the predetermined length of bar stock has been pulled to the machining position 30, that is when a feedback signal from the encoder 122 corresponds to the numerical data stored in the numerical control system 86, the numerical control system interrupts operation of the servomotor 116 and transmits a signal to the reader 82 to effect a stepping of the tape 80. In the specific preferred embodiment of the invention illustrated herein, the feedback signals from the encoder 122 are uniquely representative of the position of the gripper 56 relative to the base 53. However, it is contemplated that a pulse type feedback signal generator could be used and the pulses counted to determine the position of the gripper.

Once the desired length of bar stock 20 has been pulled to the machining position 30, the chuck 16 is operated to the closed condition to hold the bar stock against further axial movement and the gripper 56 is disengaged from the bar stock by continuing the movement of the gripper away from the spindle assembly. Accordingly, a suitable indication on the tape 80 activates the reader 82 to send a command signal to the numerical control system 86. Upon receipt of this command signal, the numerical control system 86 sends a control signal over the path 130 to the chuck actuator 22 to effect operation of the chuck 16 to the closed condition. After the chuck has been closed, the tape 80 is again stepped and command signals representing numerical data determinative of a position of the saddle 48 in which the open end of the gripper 56 is spaced from the leading end of the bar stock 24, are transmitted to the numerical control system 86. Upon receipt of this command data, the numerical control system 86 activates the servomotor 116 to continue the movement of the turret 36 in a direction away from the spindle assembly 14. Since the chuck 16 is in the closed condition, the bar stock 20 is held against axial movement and the resilient fingers 62 of the gripper 56 slide along the outer surface of the bar stock 20 until the gripper 56 is disengaged from the bar stock. When the gripper 56 is spaced a desired distance from the end of bar stock, a feedback signal from the encoder 122 corresponds to the command or reference data stored in the numerical control system 86 and the servomotor 116 is de-energized.

A drive assembly 134 is then activated to rotate the spindle assembly 14, which is supported by bearings 136, to rotate the bar stock 20 about its longitudinal axis. The turret 36 is then indexed, in accordance with the data stored on the tape 80, to move any one of the tools 34 to an operating position relative to the leading end portion of the bar stock 20. The saddle and cross-slide drive assemblies 70 and 72 are also operated in accordance with data recorded on the tape 80 to move the tools 34 into engagement with the length of bar stock at the machining position 30. From time to time during operation of the machine tool 10, the turret 36 will be indexed to bring other tools into the working position and the turret will be moved axially and transversely relative to the bar stock to perform machining operations dictated by the program stored on the tape 80.

Toward the end of the cycle of operation of the machine tool 10, the cut-off tool 54 is moved into engagement with the rotating bar stock 20 to sever the machined piece of bar stock from the main portion of the bar stock. Accordingly, the tape 81 activates the reader 82 to transfer a command signal to the numerical control system 86 which transmits a control signal over a path or connection 142 to a drive mechanism 144 for the cut-off tool 54. Activation of the drive mechanism 144 moves the cut-off tool 54 into engagement with the bar stock 20 to sever the machined end portion from the bar stock. Upon completion of this cutting or severing, the cut-off tool 54 is retracted and a feedback signal is transmitted over a path or connection 150 to the numerical control system 86. In response to this feedback signal, the numerical control system 86 again activates the reader 82 to step the tape 80 to begin the next succeeding cycle of the machine tool 10.

The machine tool 10 is capable of machining parts having different axial lengths on different cycles of operation of the machine tool. This can be accomplished without interrupting the operation of the machine tool 10 by merely storing on the tape 80 suitable data which corresponds to the lengths of bar stock 20 to be fed to the work station 30 on the successive cycles of operation of the machine tool. Thus on one cycle of operation of the machine tool 10, the data recorded on the tape 80 can be such that the servomotor 116 would be de-energized to interrupt pulling movement of the bar stock 20 toward the work station 30 after the gripper 56 has been moved for a relatively small distance from the chuck 16. On the next succeeding cycle of operation of the machine tool 10, the data stored on the tape 80 could be such as to cause the operation of the servomotor 116 to be interrupted after the gripper 56 has moved away from the chuck 16 by a relatively large distance. Therefore, a piece or part having a relatively short axial extent would be machined on the first of the foregoing operating cycles while a piece or part having a relatively long axial extent would be machined on the second of the foregoing operating cycles of the machine tool 10. It should be noted that this change of axial lengths of the parts machined on successive operations of the machine tool 10 is obtained without shutting down or interrupting the operation of the machine tool to adjust a bar feed mechanism.

Figure 5:
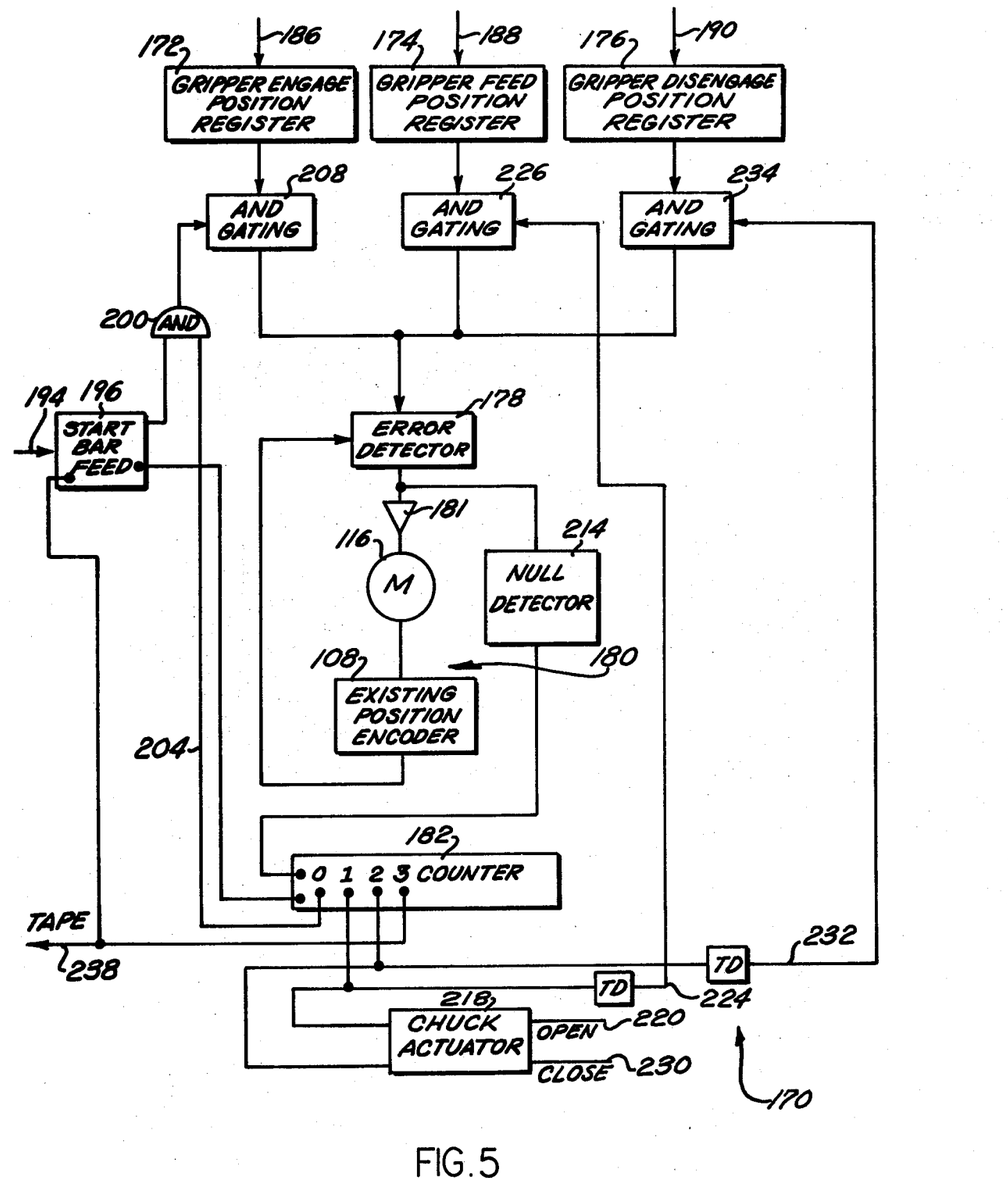
FIG. 5 is a schematic illustration of a numerical control system for controlling the feeding of bar stock to the work station.

In the embodiment of the control circuitry 76 disclosed in FIG. 3, the tape 80 is stepped or indexed on completion of each successive step of a bar stock feeding operation. Numerical control circuitry 170 which enables the bar stock feeding operation to be accomplished without indexing the tape 80 upon the completion of each step of the operation is illustrated schematically in FIG. 5. The numerical control circuitry 170 of FIG. 5 is associated with suitable control circuitry to align the gripper 56 with the chuck 16 by indexing the turret 36 and operating the servomotor 102 and to operate the spindle drive 134 and cut-off drive 144. Since the operation of the associated circuits will be understood from the foregoing description of the numerical control circuitry 76, these associated circuits have been omitted in FIG. 5 for purposes of clarity of illustration and to avoid unnecessary prolixity of description.

The numerical control circuitry 170 includes a plurality of registers 172, 174 and 176 for storing numerical data which is determinative of the positions to which the gripper 56 is to be moved by operation of the servomotor 16 during a bar stock feeding operation. This data is transmitted from each of the registers 172, 174 and 176 in turn to a error detector 178 in a servo system 180. The error detector 178 is effective to transmit an error or control signal to an amplifier 181 which operates the servomotor 116 in a proper direction to move the saddle 48 and gripper 56 to a position corresponding to the data transmitted to the error detector 178. The sequence in which the numerical data is transmitted from the registers 172, 174 and 176 to the error detector 178 where it is temporarily stored is controlled by a counter 182. The counter 182 steps between four positions, i.e., zero to three, and is returned to the zero position at the end of a cycle.

At the start of a bar stock feeding operation, the tape 80 is read by the reader 82 which transmits recorded numerical data corresponding to the position in which the gripper 56 engages the leading end portion of the bar stock 24 (FIG. 4), over path 186 (FIG. 5) to the register 172 where the numerical data is stored. Numerical data recorded on the tape 80 and corresponding to the position of the gripper 56 when the desired length of the bar stock has been fed to the work station 30 is transmitted from the reader 82 over path 188 to the register 174 where it is stored. Similarly, numerical data corresponding to the position to which the gripper 56 has to be moved to disengage the gripper from the leading end of the bar stock 20 once the desired length of the bar stock has been pulled to the work station is transmitted from the tape reader 82 over path 190 to the register 176 where this data is stored. It is contemplated that in certain machine tools the registers 172, 174 and 176 may be manually adjusted to store the desired numerical data.

After the numerical data indicating the various positions of movement of the gripper has been read from the tape 80, the tape reader 82 sends a signal over a lead 194 to actuate a start bar feed flip-flop 196. The flip-flop 196 thereupon transmits a signal to and AND gate 200 which is now conditioned by the zero output of the counter 82. The output from the AND gate activates suitable AND gating circuitry 208 to enable the numerical data stored in the register 172 to be transmitted to the error detector 178 where the numerical data is temporarily stored.

On receipt of the numerical data from the register 172, the error detector 178 compares the actual position of the saddle 48 with a commanded position represented by the numerical data from the register. An error signal is then transmitted to the amplifier 181 which operates the servomotor 116 in a direction determined by the polarity of the error signal and at a rate dependent upon the magnitude of the error signal. This operation of the servomotor 116 moves the gripper 56 into engagement with the leading end portion 24 of the bar stock 20. Thus, the servomotor 116 is energized to rotate the drive screw 118 (FIG. 3) to move the saddle 48 and gripper 56 toward the chuck 16. When the gripper has engaged the leading end portion of the bar stock 20, the actual position of the saddle 48 will correspond to the command position and the error signal from the error detector 178 will be zero. A null detector 214 detects when error signal changes to zero, that is when the gripper 56 has engaged the leading end portion 24 of the bar stock 20, and thereupon transmits a signal to the counter 182 to step the counter from the zero position to the first position.

After the leading end portion 24 of the bar stock 20 has been engaged by the gripper 56, the chuck 16 must be operated to the open condition and the gripper 56 moved away from the chuck to pull a desired length of bar stock to the work station 30. Accordingly, stepping the counter 182 to the first position sets a chuck actuator bistable flip-flop 218 to send a signal over a path 220 to the chuck actuator 22 to operate the chuck 16 to the open condition. In addition, a signal is sent over a path 224 to AND gating 226 whereupon the numerical data stored in the register 174 is transmitted to the error detector 178 and the servomotor 116 is energized to move the gripper away from the chuck 16. As the gripper 56 is being moved away from the chuck 16, the encoder 122 transmits to error detector 178 feedback signals determinative of the existing or instantaneous position of the gripper relative to the chuck 16. When a feedback signal from the encoder 122 matches or corresponds to the numerical data stored in the error detector 178, the error signal reaches zero and operation of the motor 116 is interrupted. Of course when the error signal changes to zero, the null detector 214 sends a signal to the counter 182 to step the counter to the second position.

After the desired length of bar stock has been fed to the work station 30 by the foregoing movement of the gripper 56 away from the chuck 16, the chuck is operated to the closed condition to hold the bar stock 20 against further axial movement relative to the work station 30. After the chuck 16 has been closed, the gripper 56 is disengaged from the leading end portion 24 of the bar stock 20 by continuing movement of the gripper 56 in the direction away from the chuck 16. To accomplish this upon a stepping of the counter to the second position, the chuck actuator flip-flop 218 is actuated to transmit a signal over a path 230 to the chuck actuator 22 which thereupon actuates the chuck 16 to the closed condition.

After the chuck 16 has been closed, a signal is transmitted over a path 232 to AND gating 234. The numerical data stored in the register 176 is then transmitted to the error detector 178 which operates the servomotor 116 to continue movement of the gripper 56 away from the chuck 16. Since the bar stock 20 is now held against axial movement by the closed chuck 16, the continued movement of the gripper 56 pulls it off the leading end portion 24 of the bar stock 20. After the gripper 56 has become disengaged from the bar stock 20, a feedback signal from the encoder 122 matches the data in the error detector 178 which then changes the error signal to zero to de-energize the servomotor 116 and cause the null detector 214 to send a signal to step the counter 182 to the third position.

When the gripper 56 is disengaged from the bar stock 20, the machine tool 10 is ready to begin machining operations on the bar stock at the work station 30 in accordance with a program recorded on the tape 80. Therefore, stepping the counter 182 to the third position transmits a signal to the tape reader 82 over a path 238 to index the tape 80. In addition, a signal from the counter 182 actuates the start feed flip-flop 196 to interrupt the transmission of a signal to the AND gate 200. The start bar feed flip-flop 196 has a re-set output which resets the counter 182 at the end of the bar feed cycle and holds the counter in a reset condition until the bar feed flip-flop 196 is again set to start a new cycle.

From the foregoing description, it can be seen that the machine tool 10 includes a gripper 56 which is moved away from the chuck 16 to feed the bar stock 20 by pulling it to the machining position 30. It should be noted that the provision of the gripper 56 eliminates the necessity of providing an external bar stock feed assembly as has heretofore been a common practice during operation of commercial machine tools. The gripper 56 is advantageously mounted on the turret 36 so that common drive and control assemblies can be used to effect accurate movement of the gripper 56 to feed a predetermined length of bar stock to a work station 30 and to position the tools 34 relative to this predetermined length of bar stock. The numerical control circuitry 76 is operated in accordance with a predetermined program recorded on tape 80 to activate the saddle drive assembly 70 to feed a predetermined length of bar stock to the machining position 30. This predetermined length of bar stock can be varied from one cycle of the machine tool to the next by merely recording the proper program on the tape 80. Therefore, pieces of different lengths can be machined on different cycles of the machine tool 10 without interrupting the operation of the machine tool to adjust an associated bar stock feed assembly to feed a different length of bar stock corresponding to the desired length of the next piece to be machined.

Having described a specific preferred embodiment of the invention, the following is claimed:

1. A machine for operating on bar stock with tools located in a work area, said machine comprising chuck means for holding bars stock in a position in which the bar stock extends away from one end portion of said chuck means into the work area, said chuck means being operable between a closed condition holding the bar stock against movement relative to said chuck means and an open condition in which the bar stock is movable relative to said chuck means, actuator means for effecting operation of said chuck means between the open condition and the closed condition, gripper means for gripping the bar stock in the work area adjacent to said one end portion of said chuck means, said gripper means including a plurality or resilient finger elements having surfaces defining an opening which is slightly smaller than and has the same general cross-sectional configuration as the cross-sectional configuration of one end portion of the bar stock, means for moving said gripper means away from said one end portion of said chuck means to pull bar stock from said chuck means into the work area by moving the portion of bar stock gripped by said gripper means away from said one end portion of said chuck means when said chuck means has been operated to the open condition by said actuator means, said means for moving said gripper means being operable to effect gripping engagement of said gripper means with the bar stock by moving said gripper means toward said one end portion of said chuck means when said chuck means is in the closed condition to press the finger elements against the one end portion of the bar stock and cam the finger elements outwardly to increase the size of the opening slightly and to move the finger elements into frictional engagement with an axially extending surface of the one end portion of the bar stock while the bar stock is held against axial movement by said chuck, means, and control means for controlling the operation of said actuator means and said means for moving said gripper means, said control means including means for effecting operation of said actuator means to operate said chuck means to the closed condition after bar stock has been pulled from said chuck means by movement of said gripper means away from said one end portion of said chuck means and means for disengaging said gripper means from the bar stock by continuing the movement of said gripper means away from said one end portion of said chuck means after said chuck means has been operated to the closed condition by said actuator means to slide said finger elements out of frictional engagement with the one end portion of the bar stock.

2. A machine for operating on bar stock with tools located in a work area, said machine comprising chuck means for holding bar stock in a position in which the bar stock extends away from one end portion of said chuck means into the work area, said chuck means being operable between a closed condition holding the bar stock against movement relative to said chuck means and an open condition in which the bar stock is movable relative to said chuck means, actuator means for effecting operation of said chuck means between the open condition and the closed condition, gripper means for gripping the bar stock in the work area adjacent to said one end portion of said chuck means, said gripper means includes a plurality of resilient finger elements having surfaces defining an opening which is slightly smaller than and has the same general cross-sectional configuration as the cross-sectional configuration of one end portion of the bar stock, means for moving said gripper means away from said one end portion of said chuck means to pull bar stock from said chuck means into the work area by moving the portion of bar stock gripped by said gripper means away from said one end portion of said chuck means when said chuck means has been operated to the open condition by said actuator means, said means for moving said gripper means being operable to effect gripping engagement of said gripper means with the bar stock by moving said gripper means toward said one end portion of said chuck means when said chuck means is in the closed condition to press the finger elements against the one end portion of the bar stock and cam the finger elements outwardly to increase the size of the opening slightly and to move the finger elements into frictional engagement with an axially extending surface of the one end portion of the bar stock while the bar stock is held against axial movement by said chuck means, and numerical control means for controlling operation of said means for moving said gripper means to thereby control the length of bar stock pulled from said chuck means, said numerical control means including register means for storing numerical data which is in accordance with the length of bar stock to be pulled from said chuck means by movement of said gripper means away from said one end portion of said chuck means and control means for interrupting operation of said means for moving said gripper means in response to the pulling from said chuck means of a length of bar stock which is in accordance with the numerical data stored in said register means.

3. A machine for operating on bar stock with tools located in a work area, said machine comprising chuck means for holding bar stock in a position in which the bar stock extends away from one end portion of said chuck means into the work area, said chuck means being operable between a closed condition holding the bar stock against movement relative to said chuck means and an open condition in which the bar stock is movable relative to said chuck means, actuator means for effecting operation of said chuck means between the open condition and the closed condition, gripper means for gripping the bar stock in the work area adjacent to said one end portion of said chuck means, said gripper means including surface means for frictionally engaging one end portion of the bar stock, means for moving said gripper means away from said one end portion of said chuck means to pull bar stock from said chuck means into the work area by moving the portion of bar stock gripped by said gripper means away from said one end portion of said chuck means when said chuck means has been operated to the open condition by said actuator means, said means for moving said gripper means being operable to effect gripping engagement of said gripper means with the bar stock by moving said gripper means toward said one end portion of said chuck means when said chuck means is in the closed condition to press said gripper means against the one end portion of the bar stock and move said surface means into frictional engagement with an axially extending surface of the one end portion of the bar stock while the bar stock is held against axial movement by said chuck means, and control means for controlling the operation of said actuator means and said means for moving said gripper means, said control means including means for disengaging said gripper means from the bar stock by continuing the movement of said gripper means away from said chuck means after said chuck means has been operated to the closed condition by said actuator means and sliding said surface means along the one end portion of the bar stock to move said surface means out of frictional engagement with the one end portion of the bar stock.

4. A machine as set forth in claim 2 wherein said numerical control means further includes means for operating said machine through a plurality of operating cycles in accordance with a predetermined program and means for enabling the stored numerical data to vary in accordance with the predetermined program on successive cycles of operation of said machine to enable the predetermined length of bar stock pulled from said chuck means into the work area to be varied on successive cycles of operation of said machine.

5. A machine as set forth in claim 1 wherein said control means includes numerical control means for controlling operation of said means for moving said gripper means to thereby control the length of bar stock pulled from said chuck means, said numerical control means including register means for storing numerical data which is in accordance with the length of bar stock to be pulled from said chuck means by movement of said gripper means away from said one end portion of said chuck means and control means for interrupting operation of said means for moving said gripper means in response to the pulling from said chuck means of a length of bar stock which is in accordance with the numerical data stored in said register means.

6. A machine as set forth in claim 5 wherein said numerical control means further includes means for operating said machine tool through a plurality of operating cycles in accordance with a predetermined program and means for enabling the stored numerical data to be varied in accordance with the predetermined program on successive cycles of operation of said machine tool to enable different lengths of bar stock to be pulled from said spindle assembly on successive cycles of operation of said machine tool.

7. A machine as set forth in claim 3 wherein said control means further includes numerical control means for storing numerical data which is in accordance with a predetermined length of bar stock to be pulled from said chuck means by movement of said gripper means away from said one end portion of said chuck means and means for effecting operation of said actuator means to operate said chuck means to the closed condition in response to the pulling from said chuck means of the predetermined length of bar stock to thereby hold the bar stock against further movement relative to said chuck means after the predetermined length of bar stock has been pulled from said chuck means.

8. A machine as set forth in claim 3 wherein said control means further includes numerical control means for storing numerical data which is in accordance with the selected length of bar stock to be pulled from said chuck means by movement of said gripper means relative to said chuck means and means for interrupting operation of said means for moving said gripper means in response to the pulling from said chuck means of a length of bar stock corresponding to the stored numerical data.

9. A machine as set forth in claim 3 wherein said control means includes numerical control means for controlling operation of said means for moving said gripper means to thereby control the length of bar stock pulled from said chuck means, said numerical control means including register means for storing numerical data which is in accordance with the length of bar stock to be pulled from said chuck means by movement of said gripper means away from said one end portion of said chuck means and control means for interrupting operation of said means for moving said gripper means in response to the pulling from said chuck means of a length of bar stock which is in accordance with the numerical data stored in said register means.

10. A machine as set forth in claim 7 wherein said numerical control means further includes means for operating said machine through a plurality of operating cycles in accordance with a predetermined program and means for enabling the stored numerical data to vary in accordance with the predetermined program on successive cycles of operation of said machine to enable the predetermined length of bar stock pulled from said chuck means into the work area to be varied on successive cycles of operation of said machine.

11. A machine as set forth in claim 2 wherein said actuator means is operable to operate said chuck means to the closed condition upon the pulling from said chuck means of the length of bar stock which is in accordance with the numerical data stored in said register means, said control means being operable to continue operation of said means for moving said gripper means away from said one end portion of said chuck means upon operation of said chuck means to be closed condition to disengage said gripper means from the bar stock by moving said gripper means relative to the bar stock.

12. A machine as set forth in claim 2 wherein said numerical control means further includes means for operating said machine through a plurality of operating cycles in accordance with a predetermined program and means for changing the numerical data stored in said register means in accordance with the predetermined program on successive cycles of operation of said machine to enable different lengths of bar stock to be pulled from said chuck means on successive cycles of operation of said machine.

* * * * *